(12) United States Patent
Gerhard et al.

(10) Patent No.: US 8,695,077 B1
(45) Date of Patent: Apr. 8, 2014

(54) ESTABLISHING AND CONTROLLING COMMUNICATION SESSIONS BETWEEN SIP DEVICES AND WEBSITE APPLICATION SERVERS

(71) Applicant: Sansay, Inc., San Diego, CA (US)

(72) Inventors: Glen Gerhard, San Diego, CA (US); Jonqjeng Max Sheng, San Diego, CA (US); Gerald T. Ryner, San Diego, CA (US)

(73) Assignee: Sansay, Inc., San Diego, CA (US)

( * ) Notice: Subject to any disclaimer, the term of this patent is extended or adjusted under 35 U.S.C. 154(b) by 0 days.

(21) Appl. No.: 13/827,857

(22) Filed: Mar. 14, 2013

(51) Int. Cl.
*G06F 7/04* (2006.01)
*H04L 29/06* (2006.01)

(52) U.S. Cl.
CPC .......... *H04L 63/0815* (2013.01); *H04L 60/083* (2013.01); *H04L 63/08* (2013.01)
USPC .................................................................. 726/8

(58) Field of Classification Search
CPC .... H04L 63/0815; H04L 63/083; H04L 63/08
USPC ............................ 726/5, 6, 7, 8; 709/227–228
See application file for complete search history.

(56) References Cited

U.S. PATENT DOCUMENTS

| | | | |
|---|---|---|---|
| 6,480,901 B1 | 11/2002 | Weber et al. | |
| 6,938,090 B2 * | 8/2005 | Isomaki | 709/229 |
| 8,250,634 B2 * | 8/2012 | Agarwal et al. | 726/5 |
| 2003/0159067 A1 * | 8/2003 | Stirbu | 713/201 |
| 2005/0044188 A1 | 2/2005 | Nakazawa et al. | |
| 2007/0104182 A1 | 5/2007 | Gorti et al. | |
| 2007/0110043 A1 | 5/2007 | Girard | |
| 2009/0161843 A1 | 6/2009 | Sylvain | |
| 2009/0164645 A1 | 6/2009 | Sylvain | |
| 2010/0115598 A1 * | 5/2010 | Barriga et al. | 726/8 |
| 2011/0173689 A1 * | 7/2011 | Kim et al. | 726/8 |
| 2012/0233327 A1 | 9/2012 | Smith et al. | |
| 2013/0089187 A1 * | 4/2013 | Stahl | 379/32.01 |

FOREIGN PATENT DOCUMENTS

WO        2012/060747        5/2012

* cited by examiner

*Primary Examiner* — Samson Lemma
(74) *Attorney, Agent, or Firm* — Proskauer Rose LLP

(57) ABSTRACT

Methods and apparatuses, including computer program products, are described for establishing and controlling communication sessions between SIP devices and website application servers. An access portal computing device is coupled between one or more SIP devices and one or more website application servers. The access portal is configured to authenticate SIP user credentials based upon receipt of a SIP message from a SIP device and determine website user credentials associated with a website application server based on the SIP user credentials. The access portal is configured to receive, from the website application server, a communication services application based upon transmission of the website credentials to the website application server, translate SIP requests received from the SIP device into web-based commands for transmission to the website application server, and translate web-based commands received from the website application server into SIP requests for transmission to the SIP device.

30 Claims, 9 Drawing Sheets

ESTABLISHING AND CONTROLLING COMMUNICATION SESSIONS BETWEEN SIP DEVICES AND WEBSITE APPLICATION SERVERS

TECHNICAL FIELD

This application relates generally to methods and apparatuses, including computer program products, for establishing and controlling communication sessions between Session Initiation Protocol (SIP) devices and website application servers.

BACKGROUND

The SIP protocol (RFC 3261) and Session Description Protocol (SDP) (RFC 4566) have been successful at delivering session control and presence applications from SIP Feature Servers to SIP User Agents (UAs). Common applications for SIP control include VoIP telephony, presence, messaging, video conferencing and whiteboarding. SIP is supported by a variety of UAs such as SIP hardware devices (e.g., desk phones) and SIP software clients running on personal computers or mobile devices (e.g., phones, tablets). Many SIP-based system implementations include Feature Servers providing advanced applications to support large network deployments.

However, typical SIP UAs that cannot use browser software (e.g., desktop phones) require dedicated, expensive SIP hardware and software in order to establish a communication session with other devices. As more and more web-based communication sessions migrate to website application servers using web protocols like WebRTC, older SIP UAs unable to communicate with a web-based system are in danger of being rendered obsolete—resulting in significant costs to replace these SIP devices.

SUMMARY

What is needed is a system and method to enable SIP-based devices to communicate with web-based clients via website application servers. The invention, in one aspect, features a system for establishing and controlling communication sessions between SIP devices and website application servers. The system includes an access portal computing device coupled between one or more SIP devices and one or more website application servers. The access portal computing device is configured to authenticate SIP user credentials based upon receipt of a SIP message from a SIP device indicating a request to register with the access portal computing device, and determine website user credentials associated with a website application server based on the SIP user credentials. The access portal computing device is configured to receive, from a website application server, a communication services application based upon transmission of the website user credentials to the website application server via a web-based connection. The access portal computing device is configured to translate SIP requests received from the SIP device into web-based commands for transmission to the website application server via the communication services application, and translate web-based commands received from the website application server via the communication services application into SIP requests for transmission to the SIP device, where a communication session is established between the SIP device and the website application server via the access portal computing device.

The invention, in another aspect, features a method for establishing and controlling communication sessions between SIP devices and website application servers. An access portal computing device coupled between one or more SIP devices and one or more website application servers authenticates SIP user credentials based upon receipt of a SIP message from the SIP device indicating a request to register with the access portal computing device, and determines website user credentials associated with a website application server based on the SIP user credentials. The access portal computing device receives, from the website application server, a communication services application based upon transmission of the website user credentials to the website application server via a web-based connection. The access portal computing device translates SIP requests received from the SIP device into web-based commands for transmission to the website application server via the communication services application, and translates web-based commands received from the website application server via the communication services application into SIP requests for transmission to the SIP device, where a communication session is established between the SIP device and the website application server via the access portal computing device.

The invention, in another aspect, features a computer program product, tangibly embodied in a non-transitory computer readable storage medium, for establishing and controlling communication sessions between SIP devices and website application servers. The computer program product includes instructions operable to cause an access portal computing device coupled between one or more SIP devices and one or more website application servers to authenticate SIP user credentials based upon receipt of a SIP message from a SIP device indicating a request to register with the access portal computing device, and determine website user credentials associated with a website application server based on the SIP user credentials. The computer program product includes instructions operable to cause the access portal computing device to receive, from a website application server, a communication services application based upon transmission of the website user credentials to the website application server via a web-based connection. The computer program product includes instructions operable to cause the access portal computing device to translate SIP requests received from the SIP device into web-based commands for transmission to the website application server via the communication services application, and translate web-based commands received from the website application server via the communication services application into SIP requests for transmission to the SIP device, where a communication session is established between the SIP device and the website application server via the access portal computing device.

Any of the above aspects can include one or more of the following features. In some embodiments, authenticating the SIP user credentials comprises requesting the SIP user credentials from the SIP device upon receipt of the SIP message, receiving the SIP user credentials from the SIP device based on the request for the SIP user credentials, validating the received SIP user credentials against SIP user data stored in a database coupled to the access portal computing device, and transmitting, to the SIP device, a SIP message indicating a successful registration of the SIP device. In some embodiments, transmission of the website user credentials to the website application server occurs via an HTML form request.

In some embodiments, the communication services application is a WebRTC application. In some embodiments, the communication services application includes a JavaScript module. In some embodiments, the communication services application includes one or more HTML pages.

In some embodiments, the access portal computing device translates the SIP requests into web-based commands using a SIP user profile stored in a database coupled to the access portal computing device. In some embodiments, the access portal computing device translates the web-based commands into SIP requests using a website application user profile stored in a database coupled to the access portal computing device.

In some embodiments, a communication session is established between the SIP device and a web client device connected to the website application server. In some embodiments, media flows directly between the SIP device and the web client device once the communication session between the SIP device and the web client device is established. In some embodiments, media flows between the SIP device and the web client device via the access portal computing device once the communication session between the SIP device and the web client device is established.

In some embodiments, the SIP requests and web-based commands are associated with call signaling and/or call transaction events. In some embodiments, the access portal computing device and the website application server communicate using WebSockets. In some embodiments, a network address translation (NAT) device is coupled between the SIP device and the access portal computing device. In some embodiments, the communication session between the SIP device and the website application server is encrypted.

Other aspects and advantages of the technology will become apparent from the following detailed description, taken in conjunction with the accompanying drawings, illustrating the principles of the technology by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

Figure 1:
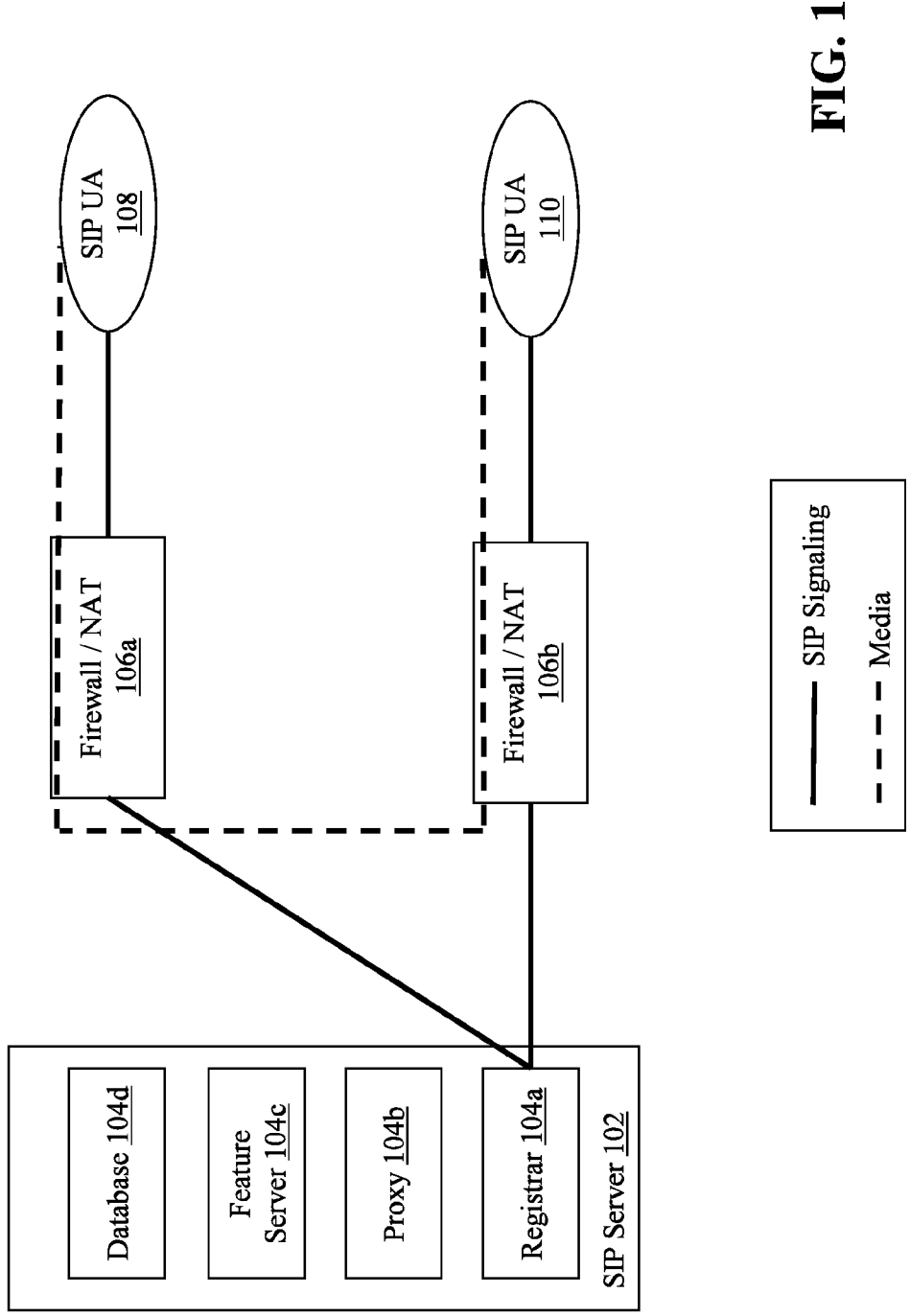
FIG. 1 is a block diagram of a SIP system for establishing and controlling communication sessions between SIP user agents.

FIG. 1 is a block diagram of a SIP system 100 for establishing and controlling communication sessions between SIP user agents (e.g., SIP UAs 108, 110). The system 100 includes a SIP server computing device 102 with several modules designed to establish and control SIP sessions between SIP UAs 108, 110. The modules include a registrar 104a for authorizing and authenticating SIP UAs that attempt to connect to the server, a proxy module 104b for providing dynamic routing and other dial plan features, a feature server 104c for providing call-based applications such as voicemail and services like transcoding and call events (e.g., forwarding, simultaneous ringing), and a database 104d for storing information such as user profiles and service levels. Using the system 100 of FIG. 1, a SIP UA 108 wants to establish a SIP communication session (e.g., call) with SIP UA 110. The SIP UA 108 connects to the SIP server 102 via a firewall/Network Address Translation (NAT) device 106a. The registrar 104a at the SIP server 102 authenticates the SIP UA 108 and transmits a SIP INVITE message to SIP UA 110. The SIP UA 110 sends a 200 OK message back to the SIP server 102, and the SIP server transmits the 200 OK message to the originating SIP UA 108. The SIP UA 108 acknowledges the 200 OK message, and the two SIP UAs 108, 110 begin transmitting media directly between each other while the SIP signaling is still transmitted via the SIP server 102 to take advantage of the server's call handling, presence and application features.

Recently, a new communication architecture based on WebRTC has been established to use the Hypertext Transfer Protocol (HTTP) to provide communication services similar to SIP. WebRTC leverages a standard web browser as a low cost device to replace the SIP UA as the voice, video, messaging, and presence terminal. WebRTC is just one example of a way to provide multimedia communications from a web server; other paradigms are available. Many web servers use a combination of HTTP, HTTP Secure (HTTPS), WebSockets, JavaScripts, Applets, or Hypertext Markup Language (HTML) for application creation and execution. Application design for such a web server is simplified with these tools and direct browser control. Benefits of the WebRTC-based approach include the ability to use existing high capacity, load-balanced web servers to replace SIP feature servers, and enable a client application available on almost any modern computing device—the web browser—to be a replacement for many hardware-based phone devices (such as legacy SIP-based desktop phones).

Figure 2:
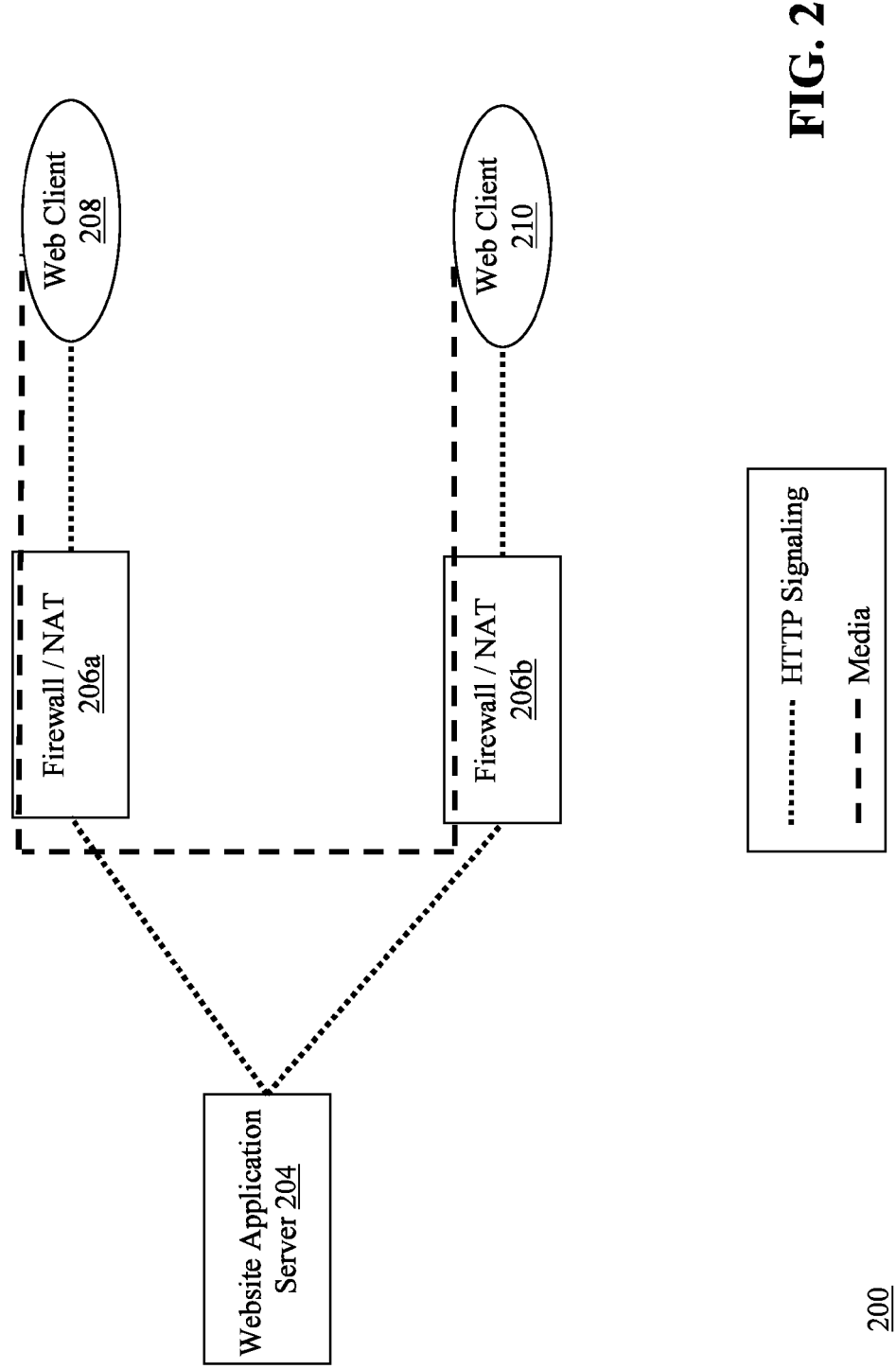
FIG. 2 is a block diagram of a system for establishing and controlling communication sessions between web clients using the WebRTC protocol.

FIG. 2 is a block diagram of a system 200 for establishing and controlling communication sessions between web clients (e.g., web clients 208, 210) using the WebRTC protocol. The system 200 includes a website application server 204 that is coupled to a plurality of web clients 208, 210 via respective firewall/NAT devices 206a-206b. The web clients 208, 210 can include browser software installed on a computing device (e.g., personal computer, smartphone, tablet, and the like). Using the system 200 of FIG. 2, a web client 208 wants to establish a WebRTC communication session with web client 210. The web client 208 connects to the website application server 204 via firewall/NAT device 206a. The website application server 204 authenticates the web client 208 and connects to web client 210 via firewall/NAT device 206b. The two web clients 208, 210 begin transmitting media directly between each other while the HTTP signaling is still passed through via the website application server 204 to take advantage of the server's WebRTC call handling, presence and application features.

Figure 3:
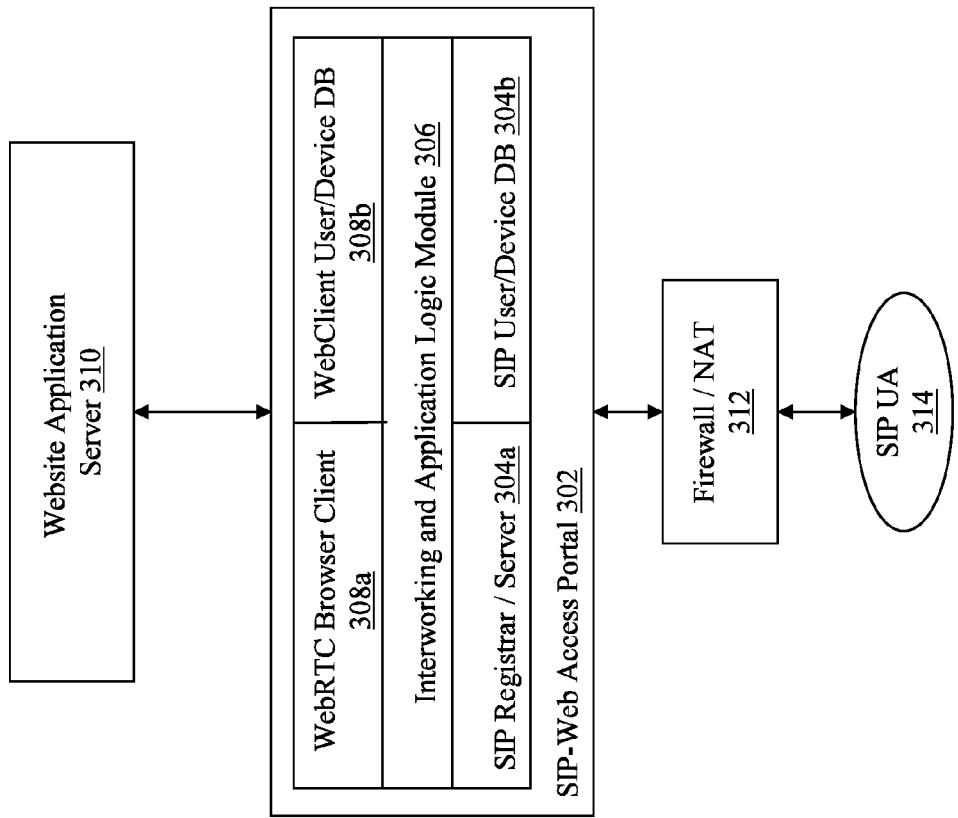
FIG. 3 is a block diagram of a system for establishing and controlling communication sessions between SIP devices and website application servers.

FIG. 3 is a block diagram of a system 300 for establishing and controlling communication sessions between SIP devices and website application servers, according to an embodiment of the invention. The system 300 includes a SIP-Web Access Portal computing device 302 that is coupled to a website application server 310 and to a SIP UA device 314 via a Firewall/NAT device. The elements shown in FIG. 3 can be coupled via an IP-based communications network (not shown), such as the Internet.

The SIP-Web Access Portal 302 includes a number of modules to enable the establishment and control of communication sessions between the SIP UA 314 and the website application server 310. The modules include a SIP registrar/server module 304a and corresponding SIP user/device database 304b, an interworking and application logic module 306, and a WebRTC browser client 308a and corresponding WebClient user/device database 308b. The modules 304a-304b, 306, and 308a-308b are hardware and/or software modules located in the SIP-Web Access Portal 302 and used to execute the method for establishing and controlling communication sessions between SIP devices and website application servers. As shown in FIG. 3, the SIP user/device database 304b and the WebClient user/device database 308b are local to the SIP-Web Access Portal 302. In other embodiments, the SIP user/device database 304b and the WebClient user/device database 308b are located on one or more remote devices and are coupled to the Access Portal 302 via a network connection so that the Access Portal 302 can access the databases 304b and 308b in a secure and timely fashion. In some embodiments, a full-featured session border controller (SBC) is also present inside the SIP-Web Access Portal 302 whenever a media relay function is needed. It should be appreciated that any number of computing devices, arranged in a variety of architectures, resources, and configurations (e.g., cluster computing, virtual computing, cloud computing) can be used without departing from the scope of the invention.

As will be explained in greater detail below, the SIP registrar/server module 304a is configured to receive SIP registration and call flow messages from SIP UAs (e.g., SIP UA 314) that attempt to connect to the Access Portal 302. The SIP registrar/server module 304a is capable of retrieving user profile data such as user credential data and service configuration and subscription data from the corresponding SIP user/device database 304b for use in authenticating and registering SIP UAs. From the SIP UA's perspective, the SIP-Web Access Portal 302 appears like a typical SIP registrar and feature server.

An example SIP user profile stored in the SIP user/device database 304b can include:
<Service Port>: The IP port used to establish transport layer connections for the user.
<SIP Username>: The Username within the requesting URI or SIP From field.
<SIP Password>: Used for authentication of the user agent.
<SIP Domain>: The domain portion of the requesting URI or SIP From field.
<UA Preferences>: Control values for security, transport, and feature set.
<SIP Media Preferences>: Controls the candidate offering, codec offering and port learning behavior for SIP sessions.
<Web Client Profile>: The linked web client user profile for the user to exercise toward the website application server.

The WebRTC browser client module 308a is configured to establish a WebRTC-based communication session with the website application server 310. For example, the WebRTC browser client module 308a can issue HTML form requests to the website application server 310 and receive HTML service pages and related scripts (e.g., WebSockets, Javascript) for use in generating a WebRTC-based session with the application server 310. The WebRTC browser client module 308a is also capable of retrieving user profile data such as user credential data and service configuration and subscription data from the corresponding WebClient user/device database 308b for use in authenticating and registering the client module 308a with the website application server 310. From the website application server's perspective, the SIP-Web Access Portal 302 appears like a typical web browser client.

As the SIP UA 314 communicates over an IP network to the SIP-Web Access Portal 302, the SIP UA uses normal transport methods such User Datagram Protocol (UDP), Transmission Control Protocol (TCP), Transport Layer Security (TLS) or Datagram Transport Layer Security (DTLS). The connection between the SIP-Web Access Portal 302 and the website application server 310 is established using HTTP and/or HTTPS, but can switch to WebSockets (RFC 6455) as needed. The IP layer three protocol can be either IPv4 or IPv6 and be used for signaling and media control of both SIP UAs and website application servers.

An example website user profile stored in the WebClient user/device database 308b can include:
<Service Port>: The IP port used to establish transport layer connections for the website application server.
<Web Username>: The Username within the login request to the website application server.
<Web Password>: Used for gaining authentication from the website application.
<Web Domain>: The domain portion of the login request to the website application server.
<Link Pages>: A list of the URI pages to request for the service sequences.
<Browser Preferences>: Control values for security, transport and data peer connections.
<Keyword Action Mapping>: The HTML, WebSockets or JavaScript keywords linking to SIP state changes or actions which are utilized by the interworking and application logic module. This mapping is configurable to match specific application pages and procedures.
<Web Media Preferences>: Controls the candidate offering and codec options for browser local media and peer connections.

The interworking and application logic module 306 is configured to coordinate communications between the SIP registrar/server module 304a and the WebRTC browser client 308a for purposes of establishing and controlling a communication session between the SIP UA 314 and the website application server 310. The interworking and application logic module 306 receives SIP call flow messages from the SIP registrar/server module 304a and translates the SIP call flow messages to equivalent web-based call flow commands for transmission to the WebRTC browser client 308a for use in a WebRTC-based communication session. Similarly, the interworking and application logic module 306 receives web-based call flow commands from the WebRTC browser client 308a and translates the web-based call flow messages to equivalent SIP requests for transmission to the SIP registrar/server module 304a.

Once the HTML service pages and/scripts (e.g., JavaScripts) have been received by the SIP-Web Access Portal 302 and executed by the WebRTC browser client 308a, the SIP UA 314 has communication features available. For example, the features include functions such as inbound and outbound voice/video sessions, presence notifications (e.g., busy lamp field, waiting voice mail message), session transfers, session conferencing, messaging/chat and whiteboarding. The SIP-Web Access Portal 302 delivers the features based on the SIP requests from the SIP UA 314 and the associated configuration for the JavaScripts or WebSockets accessed by the interworking and application logic module 306. The SIP-Web Access Portal 302 accepts and provides tokens or cookies as needed by the website application server 310 to construct services for the UA 314 transparently. Certain call events such as On-Hold, DTMF, Refer messages trigger input from the SIP-Web Access Portal 302 to the website application server 310. The techniques leveraging the SIP user profile and the website user profile and mapping the two profiles together ensures that the website application server 310 scripts/HTML pages are properly interpreted and translated into SIP functions for the UA 314, and to ensure the website application server 310 receives the proper notification of UA behavior in a timely manner.

Figure 4:
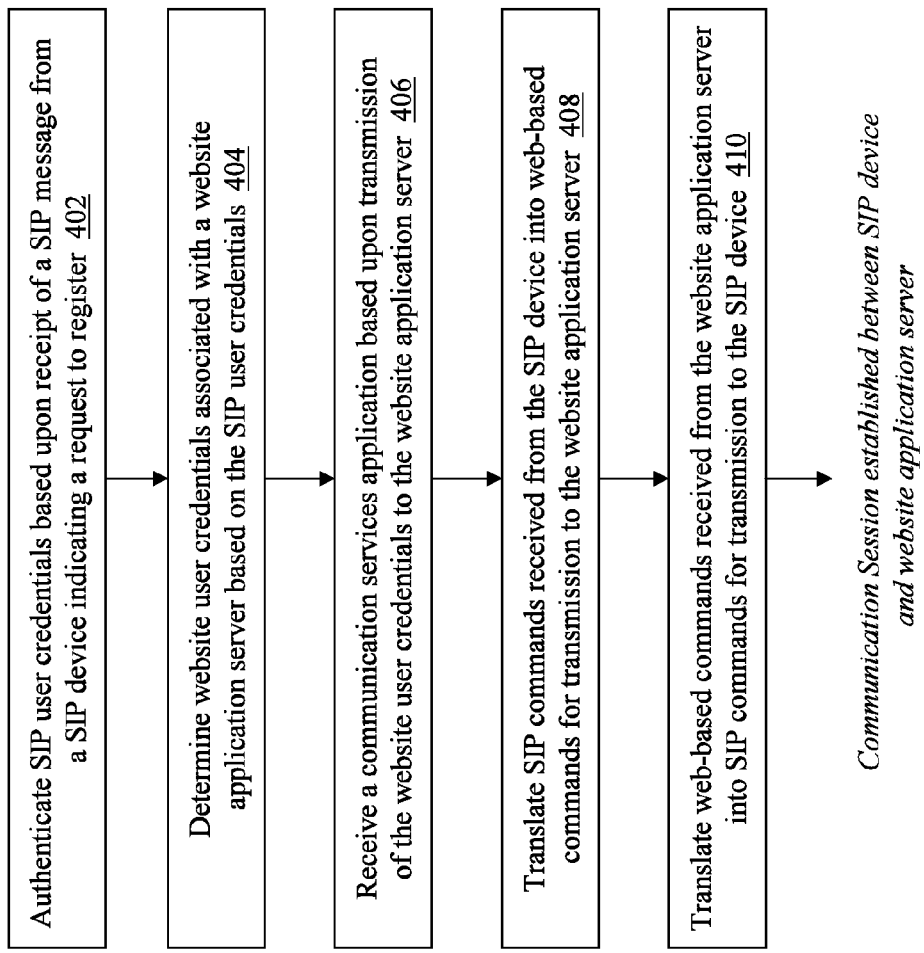
FIG. 4 is a flow diagram of a method for establishing and controlling communication sessions between SIP devices and website application servers.

FIG. 4 is a flow diagram of a method 400 for establishing and controlling communication sessions between SIP devices and website application servers, using the system 300 of FIG. 3. The SIP registrar/server module 304a of the SIP-Web Access Portal 302 authenticates (402) SIP user credentials based upon receipt of a SIP message from the SIP UA 314 indicating a request to register with the SIP-Web Access Portal 302.

For example, when the SIP UA 314 is powered on, the UA 314 can send a SIP REGISTER message to the SIP registrar/server module 304a. The SIP registrar/server module 304a first attempts to locate the user associated with the SIP UA 314 in the SIP user/device database 304b. If the registrar/server module 304a determines that the user is valid and exists in the database 304b, the registrar/server module 304a performs typical SIP authentication procedures using a random challenge. The SIP UA 314 then responds to the challenge with a digital signature derived from its user password. The registrar/server module 304a then verifies the signature by using the user password stored in the SIP user/device database 304b. If the authentication check succeeds, the registrar/server module 304a sends a 200 OK SIP response to the SIP UA 314 in order to confirm a successful registration.

The registrar/server module 304a then notifies the interworking and application logic module 306 about the new registered SIP UA 314 and subscriber. The interworking and application logic module 306 then uses data from the SIP user/device database 304b user record to determine which website services are to be initiated.

The interworking and application logic module 306 determines (404) website user credentials associated with the website application server 310 based on the SIP user credentials previously retrieved by the SIP registrar/server module 304a. The interworking and application logic module 306 instructs the WebRTC browser client module 308a to initiate a web-based connection to a particular website URL associated with the website application server 310. The WebRTC browser client module 308a automatically logs into the website application server 310 using the website user credentials (e.g., username, password) for the user. For example, the WebRTC browser client module 308a can issue a HTML form request—including the website user credentials—to the website application server 310. The application server 310 can validate the website user credentials and allow access to the WebRTC browser client module 308a, just like any web client that attempts to access the application server 310.

Once the WebRTC browser client 308a has logged in to the website application server 310, the WebRTC browser client 308a receives (406) a communication services application from the website application server. In some embodiments, the communication services application includes one or more HTML service pages and/or scripts (e.g., WebSockets, Javascript) associated with a WebRTC application offered by the website application server 310. The WebRTC browser client 308a then executes the pages and/or script(s) on behalf of the SIP UA 314.

Once the WebRTC browser client 308a has executed the communication services application, the SIP UA 314 can begin communicating with the website application server 310 via the SIP-Web Access Portal 302. The Access Portal 302 translates (408) SIP requests received from the SIP UA 314 into web-based commands for use with the executing communication services application and transmission to the website application server 310. For example, the SIP UA 314 may want to establish a voice call with a web-based client device (not shown) that is also coupled to the website application server 310. The SIP UA 314 can transmit a SIP INVITE message to the SIP-Web Access Portal 302, and the interworking and application logic module 306 can translate the SIP INVITE message into an equivalent WebRTC command (e.g., 'offer') and supply the translated command to the communication services application currently executing in the WebRTC browser client module 308a. The WebRTC browser client 308a can transmit the offer to the website application server 310 for processing and communication with the web-based client.

Similarly, the Access Portal 302 translates (410) web-based commands received from the website application server 310 into SIP requests for transmission to the SIP UA 314. Continuing with the above example, the website application server 310 may transmit a WebRTC response (e.g., 'answer') to the SIP UA's original INVITE message. The interworking and application logic module 306 translates the answer into an equivalent SIP command (e.g., SIP 200 OK message) and transmits the translated command to the SIP UA 314.

As a result, both the SIP UA 314 and the website application server 310 communicate with the SIP-Web Access Portal 302 using protocols (e.g., SIP for SIP UA, WebRTC for website application server) that the devices 314, 310 are already configured to use. The SIP-Web Access Portal 302 is responsible for translating the respective protocols to establish and control a media communication session (e.g., voice call, video conference) between the SIP UA 314 and the website application server 310 without requiring any modification or customization of the respective end devices 314, 310.

Figure 5A:
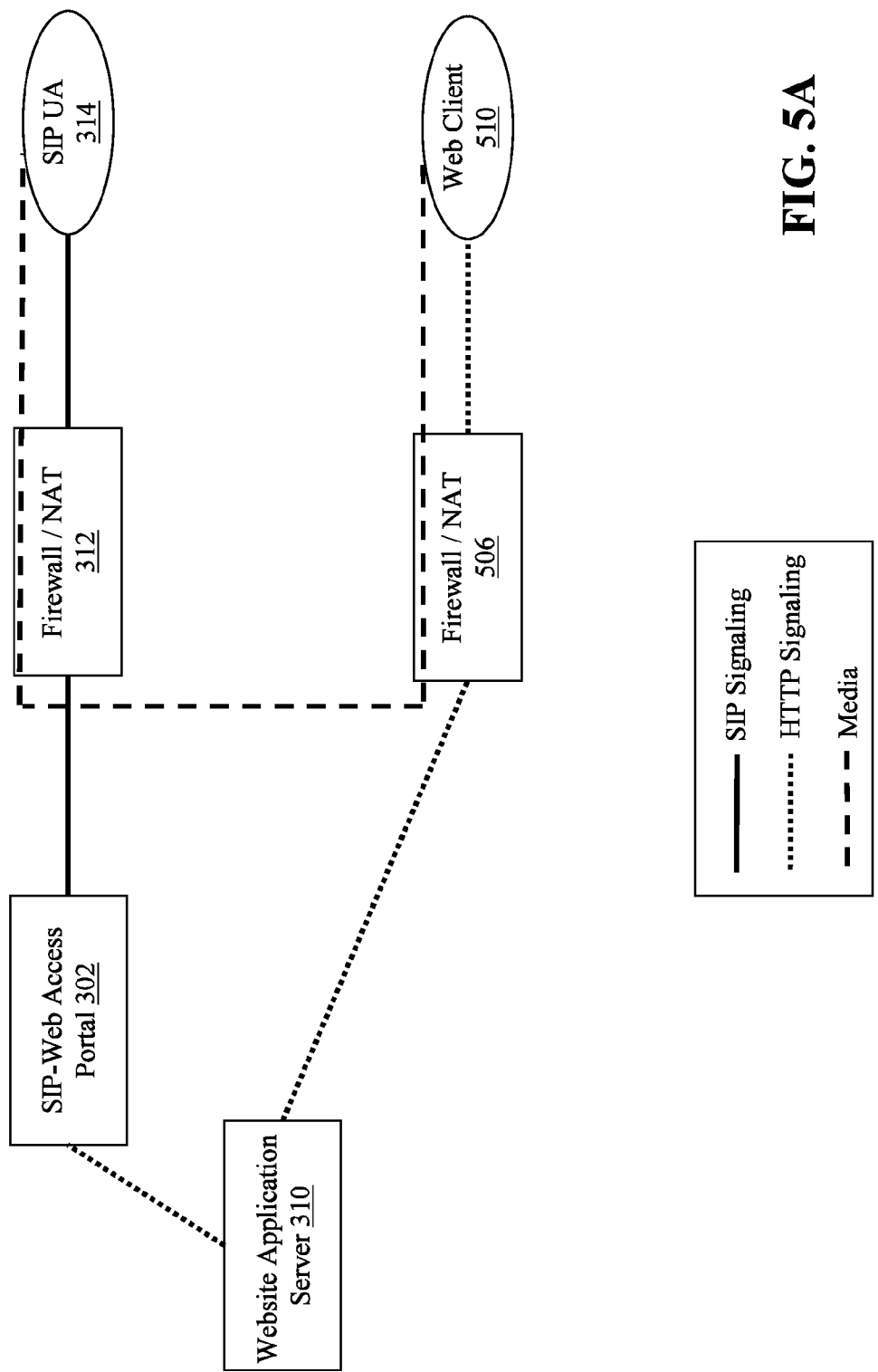
FIG. 5A is a diagram of signaling and direct media flow between a SIP device and a web client device, using the system of FIG. 3.
Figure 5B:
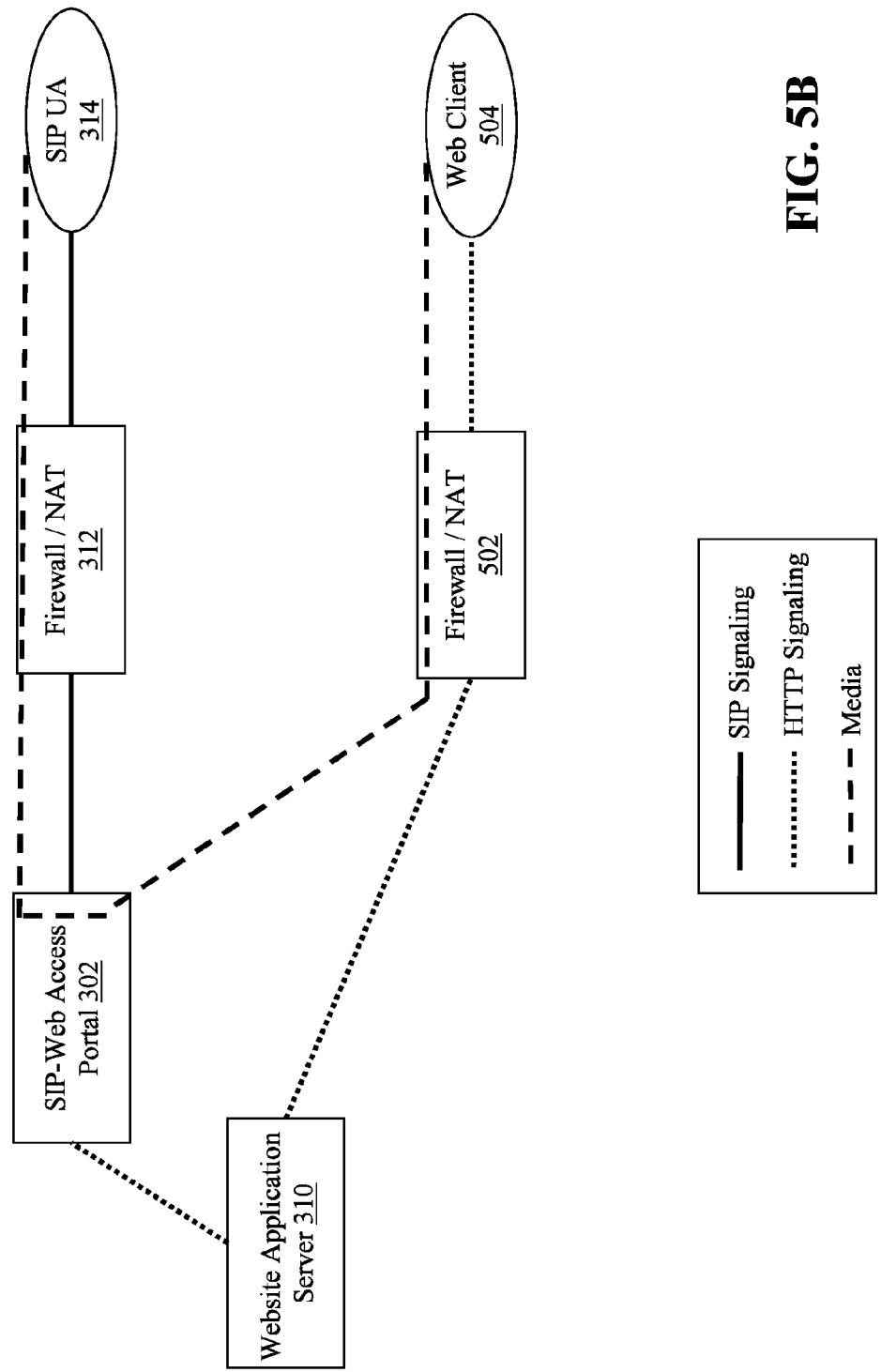
FIG. 5B is a diagram of signaling and proxy media flow between a SIP device and a web client device, using the system of FIG. 3.

FIGS. 5A-5B depict two exemplary signaling path configurations for media communication sessions established using the system 300 of FIG. 3. FIG. 5A is a diagram of signaling and direct media flow between a SIP device (e.g., SIP UA 314) and a web client device 510, using the system 300 of FIG. 3. As described previously, the SIP UA 314 connects to the SIP-Web Access Portal 302 via a firewall/NAT device 312 using standard SIP registration and signaling techniques. Similarly, browser software on the web client device 510 connects through a firewall/NAT device 506 to the website application server 310 that provides WebRTC-based communication session services using standard HTTP signaling techniques. The SIP-Web Access Portal 302 communicates with the website application server 310 over a HTTP connection and, as set forth above, the SIP-Web Access Portal 302 receives a communication services application from the website application server 310 for use in establishing a media session between the SIP UA 314 and the web client 510. Once the media session is established, the media flows directly between the SIP UA 314 and the web client 510 (via their respective firewall/NAT devices 312, 506). The session signaling messages are still transferred between the endpoints 314, 510 via the website application server 310 and the SIP-Web Access Portal 302 for purposes of call session control (e.g., keepalive, tear down), call event management (e.g., on hold), and feature provision (e.g., presence coordination).

FIG. 5B is a diagram of signaling and proxy (or indirect) media flow between a SIP device (e.g., SIP UA 314) and a web client device 504, using the system 300 of FIG. 3. As described previously, the SIP UA 314 connects to the SIP-Web Access Portal 302 via a firewall/NAT device 312 using standard SIP registration and signaling techniques. Similarly, browser software on the web client device 504 connects through a firewall/NAT device 502 to the website application server 310 that provides WebRTC-based communication session services using standard HTTP signaling techniques. The SIP-Web Access Portal 302 communicates with the website application server 310 over a HTTP connection and, as set forth above, the SIP-Web Access Portal 302 receives a communication services application from the website application server 310 for use in establishing a media session between the SIP UA 314 and the web client 510. Once the media session is established, the media flows between the SIP UA 314 and the web client device 504 (via their respective firewall/NAT devices 312, 502) through the SIP-Web Access Portal 302. The media flow configuration of FIG. 5B enables the SIP-Web Access Portal 302 to maintain the quality of the media session by routing the session traffic according to load balancing concerns and to monitor attributes of the media session for other purposes (e.g., call duration, destination, bandwidth usage).

Example Call Flows

Figure 6:
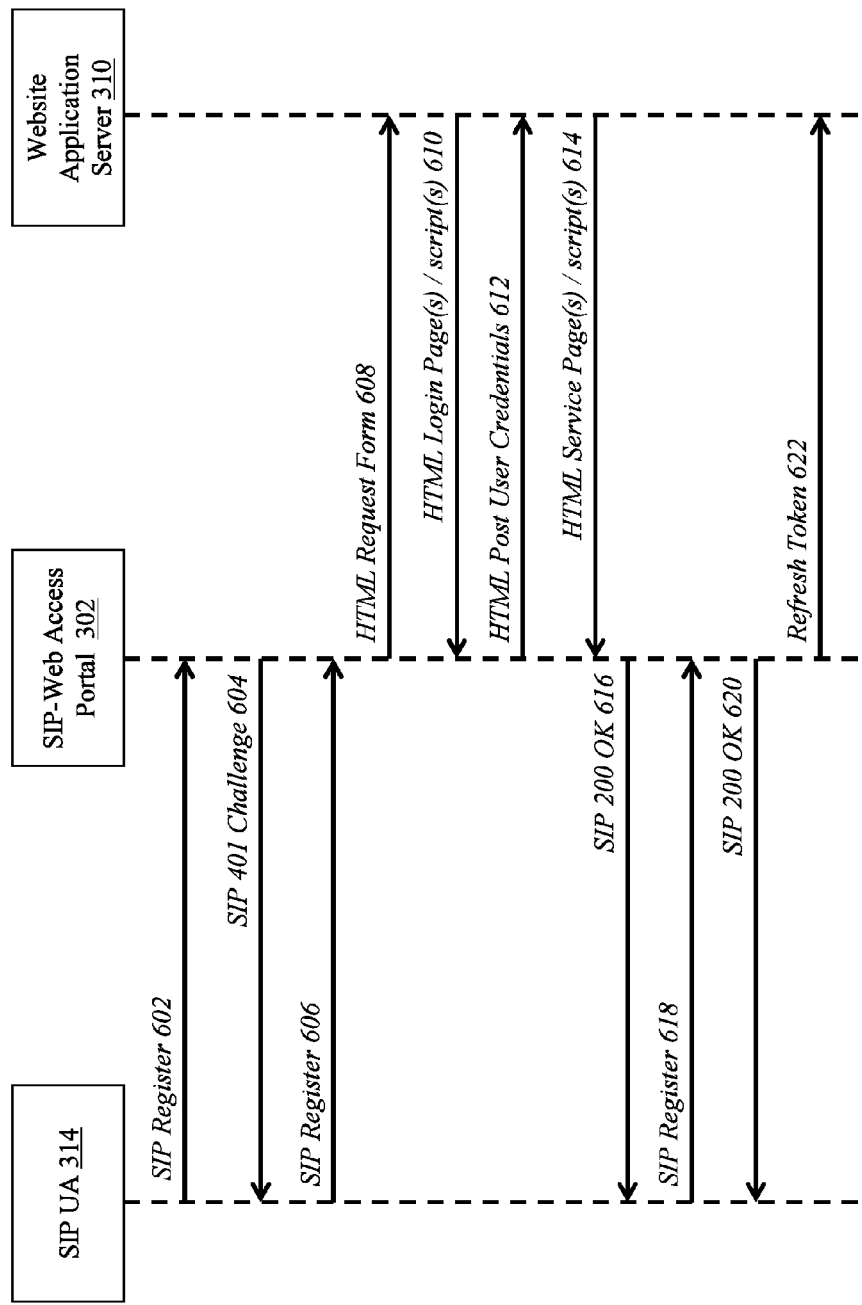
FIG. 6 is a diagram of an exemplary registration request call flow using the system of FIG. 3.
Figure 7:
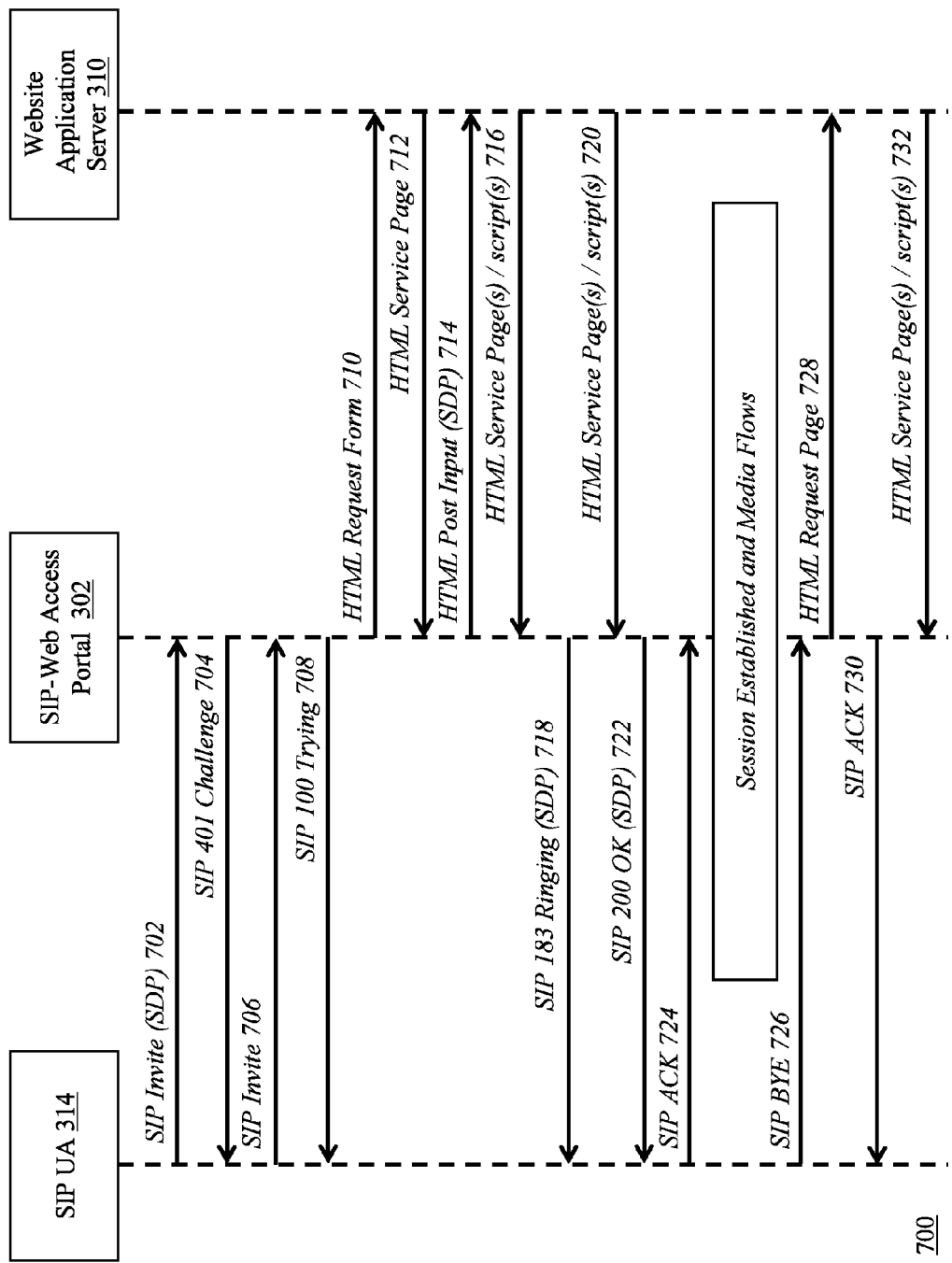
FIG. 7 is a diagram of an exemplary outbound call flow from a SIP device using the system of FIG. 3.
Figure 8:
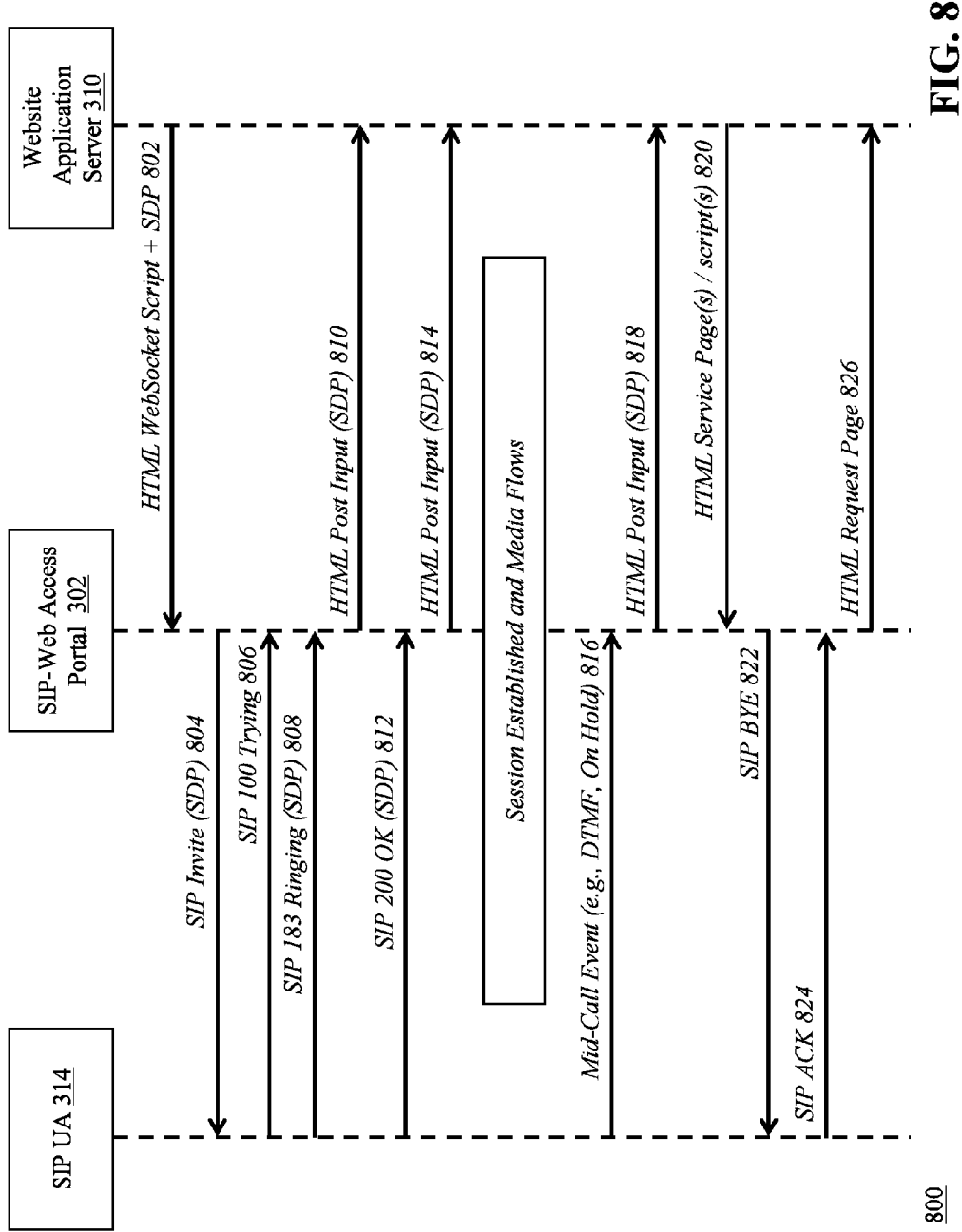
FIG. 8 is a diagram of an exemplary inbound call flow to a SIP device using the system of FIG. 3.

FIGS. 6-8 are diagrams of example call flows using the system 300 of FIG. 3. It should be appreciated that a number of different call flows and configurations can be used without departing from the scope of the invention.

FIG. 6 is a diagram of an exemplary registration request call flow 600 where SIP UA 314 attempts to register with the SIP-Web Access Portal 302. The SIP UA 314 transmits a SIP Register message 602 to the SIP-Web Access Portal 302. The SIP registrar/server module 304*a* receives the SIP Register message and issues a SIP 401 Challenge response 604 to the SIP UA 314. The SIP UA 314 then prompts the user to enter his or her credentials, and the SIP UA 314 transmits another SIP register message 606 to the SIP-Web Access Portal 302—including the credentials entered by the user. The SIP registrar/server module 304*a* authenticates the SIP UA 314 using the supplied credentials and the interworking and application logic module 306 of the SIP-Web Access Portal 302 determines website user credentials associated with the user based on the SIP credentials.

The WebRTC browser client module 308*a* of the SIP-Web Access Portal 302 then transmits a HTML request form 608 to the website application server 310 (e.g., by navigating to a particular URL for the website application server). The WebRTC browser client module 308*a* receives HTML login page(s) and/or script(s) 610 in response to the HTML Request Form 608 that ask the WebRTC browser client module 308*a* for website user credentials. For example, the website application server 310 may provide a login form asking for a username and password. In another example, the website application server 310 may provide a JavaScript application that is executed by the WebRTC browser client module 308*a* and includes prompts for a username and password. The WebRTC browser client module 308*a* then issues a HTML Post command 612 to the website application server 310 that includes the website user credentials previously determined. Upon successful authentication of the website user credentials, the application server 310 transmits one or more HTML services pages and/or scripts 614 to the SIP-Web Access Portal 302 that correspond to a WebRTC communication application. The interworking and application logic module 306 recognizes receipt and execution of the WebRTC application and transmits a SIP 200 OK message 616 to the SIP UA 314. Now, the SIP UA 314 is registered with the SIP registrar/server module 304*a* of the SIP-Web Access Portal 302 and can communicate via the interworking and application logic module 306 with the website application server 310.

Periodically, the SIP UA 314 transmits a SIP Re-register message to the SIP-Web Access Portal 302. The re-register message notifies the SIP-Web Access Portal 302 that the SIP UA 314 is still present and active. In addition, even if media is flowing to the UA 314, the signaling port through the Firewall/NAT 312 can be closed—resulting in a hung call and unable to signal a tear down. The re-register message keeps the signaling conduit open for the bidirectional SIP signaling path. In some embodiments, the SIP-Web Access Portal 302 may transmit a refresh token command 622 to the website application server 310 to maintain the HTTP session between the devices 302, 310.

FIG. 7 is a diagram of an exemplary outbound call flow 700 from SIP UA 314 using the system 300 of FIG. 3. The SIP UA 314 transmits a SIP INVITE message 702 to the SIP registrar/server module 304*a* of the SIP-Web Access Portal 302. The SIP INVITE message 702 includes a SDP with session attributes of the SIP UA 314. The SIP registrar/server module 304*a* receives the SIP INVITE message and issues a SIP 401 Challenge response 704 to the SIP UA 314. The SIP UA 314 then prompts the user to enter his or her credentials, and the SIP UA 314 transmits another SIP INVITE message 706 to the SIP-Web Access Portal 302—including the credentials entered by the user. The SIP-Web Access Portal 302 returns a SIP 100 Trying message 708 to the SIP UA 314, indicating to the SIP UA 314 that the SIP registrar/server module 304*a* is conducting a search for the call recipient.

The interworking and application logic module 306 determines a URL associated with the website application server 310 based on the SIP INVITE message, and the WebRTC browser client module 308*a* transmits a HTML request form 710 using the URL to the website application server 310. The website application server 310 returns a HTML service page 712 to the WebRTC browser client 308*a* requesting call session details (e.g., SDP, encryption keys). The WebRTC browser client 308*a* transmits a HTML post command, including the SDP, to the website application server 714—which then attempts to connect to the receiving device (e.g., a web client device). At the same time, the website application server 310 transmits HTML service page(s) and/or script(s) 716 to the WebRTC browser client 308*a* for execution (e.g., the WebRTC application). The interworking and application logic module 306 translates the received HTML service page(s)/script(s) into a SIP 183 Ringing message 718 and transmits the Ringing message 718 to the SIP UA 314, indicating that an attempt to connect a receiving device is being made.

Once the website application server 310 has connected to the receiving device, the server 310 transmits additional HTML service page(s)/script(s) 720 to the SIP-Web Access Portal 302 that correspond to a successful connection to the receiving device. The interworking and application logic module 306 translates the additional HTML service page(s)/script(s) 720 into a SIP 200 OK message 722 and transmits the OK message to the SIP UA 314—which then sends back a SIP ACK message 724 to the SIP-Web Access Portal 302. Once the SIP UA 314 has acknowledged the connection, a communication session is established between the SIP UA 314 and the receiving device and media can flow between the two devices.

At the conclusion of the media session, the SIP UA 314 transmits a SIP BYE message 726 to the SIP registrar/server module 304*a*. The interworking and application logic module 306 translates the BYE message into a HTML request 728, and the WebRTC browser client 308*a* transmits the request 728 to the website application server 310. The SIP registrar/server module 304*a* also transmits a SIP ACK message 730 back to the SIP UA 314 to acknowledge receipt of the BYE message. The server 310 ends the call session with the receiving device and transmits appropriate HTML service page(s)/script(s) 732 to the WebRTC browser client 308*a* to end the WebRTC application and corresponding session.

FIG. 8 is a diagram of an exemplary inbound call flow 800 to SIP UA 314 using the system 300 of FIG. 3. A call originating device (e.g., a web client) connects to the website application server 310 to establish a communication session with SIP UA 314. The website application server 310 transmits a HTML WebSocket script and a SDP 802 to the WebRTC browser client 308*a* of the SIP-Web Access Portal 302. The client 308*a* executes the script and the interworking and application logic module 306 translates the script into a SIP INVITE message 804. The SIP registrar/server module 304*a* transmits the SIP INVITE message 804, including the SDP, to the SIP UA 314. A SIP 100 Trying message 806 is returned to the SIP registrar/server module 304*a* while the SIP UA 314 is located, and the SIP UA 314 transmits a SIP 183 Ringing message 808 to the SIP registrar/server module 304*a* as the user of the SIP UA is alerted to the incoming call. The interworking and application logic module 306 translates the Ringing message 808 into a web-based command that is supplied to the WebRTC communication application executed by the WebRTC browser client 308*a*, which then transmits the command as HTML post input 810 to the website application server 310 to inform the server 310 that the receiving user is currently being alerted to the call.

Once the user of the SIP UA 314 has accepted the call, the SIP UA 314 returns a SIP 200 OK message 812 indicating the acceptance and the interworking and application logic module 306 translates the OK message 812 into a web-based command that is supplied to the WebRTC communication application executed by the WebRTC browser client 308*a*, which then transmits the command as HTML post input 814 to the website application server 310. At this point, a communication session is established between the SIP UA 314 and the receiving device and media can flow between the two devices.

During the session, the SIP UA 314 may transmit a call event (e.g., DTMF tones, on-hold indicator, other presence information) 816 to the SIP registrar/server module 304*a*. The interworking and application logic module 306 translates the mid-call event 816 into a web-based command that is supplied to the WebRTC communication application executed by the WebRTC browser client 308*a*, which then transmits the web-based command as HTML post input 818 to the website application server 310. In response, the website application server 310 transmits certain HTML service page(s)/script(s) 820 corresponding to the mid-call event back to the WebRTC browser client 308*a*.

For example, if the event is a call terminating event, the interworking and application logic module 306 translates the HTML service page(s)/script(s) 820 into a SIP BYE message 822 and the SIP registrar/server module 304*a* sends the BYE message to the SIP UA 314, indicating to the SIP UA 314 that the originating device has ended the call. The SIP UA 314 returns a SIP ACK message 824 confirming that the session has ended and the interworking and application logic module 306 translates the ACK message 824 into an equivalent HTML request 826 for transmission to the website application server 310.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

The invention claimed is:

1. A system for establishing and controlling communication sessions between Session Initiation Protocol (SIP) devices and website application servers, the system comprising:

an access portal computing device coupled between one or more SIP devices and one or more website application servers, the access portal computing device being separate from the SIP devices and each SIP device communicating with the access portal computing device only via a SIP session, the access portal computing device configured to:

authenticate SIP user credentials based upon receipt of a SIP message from a SIP device indicating a request to register with the access portal computing device;

determine website user credentials associated with a website application server based on the SIP user credentials;

receive, from the website application server, a communication services application based upon transmission of the website user credentials to the website application server via a web-based connection;

translate, at the access portal computing device, SIP requests received from the SIP device into web-based commands for transmission to the website application server via the communication services application; and translate, at the access portal computing device, web-based commands received from the website application server via the communication services application into SIP requests for transmission to the SIP device;

wherein a communication session is established between the SIP device and the website application server via the access portal computing device.

2. The system of claim 1, wherein authenticating the SIP user credentials comprises:

requesting the SIP user credentials from the SIP device upon receipt of the SIP message;

receiving the SIP user credentials from the SIP device based on the request for the SIP user credentials;

validating the received SIP user credentials against SIP user data stored in a database coupled to the access portal computing device; and transmitting, to the SIP device, a SIP message indicating a successful registration of the SIP device.

3. The system of claim 1, wherein transmission of the website user credentials to the website application server occurs via an HTML form request.

4. The system of claim 1, wherein the communication services application is a WebRTC application.

5. The system of claim 4, wherein the communication services application includes a JavaScript module.

6. The system of claim 4, wherein the communication services application includes one or more HTML pages.

7. The system of claim 1, wherein the access portal computing device translates the SIP requests into web-based commands using a SIP user profile stored in a database coupled to the access portal computing device.

8. The system of claim 1, wherein the access portal computing device translates the web-based commands into SIP requests using a website application user profile stored in a database coupled to the access portal computing device.

9. The system of claim 1, further comprising establishing a communication session between the SIP device and a web client device connected to the website application server.

10. The system of claim 9, wherein media flows directly between the SIP device and the web client device once the communication session between the SIP device and the web client device is established.

11. The system of claim 9, wherein media flows between the SIP device and the web client device via the access portal computing device once the communication session between the SIP device and the web client device is established.

12. The system of claim 1, wherein the SIP requests and web-based commands are associated with call signaling and/or call transaction events.

13. The system of claim 1, wherein the access portal computing device and the website application server communicate using WebSockets.

14. The system of claim 1, further comprising a network address translation (NAT) device coupled between the SIP device and the access portal computing device.

15. A method for establishing and controlling communication sessions between Session Initiation Protocol (SIP) devices and website application servers, the method comprising:
    authenticating, by an access portal computing device coupled between one or more SIP devices and one or more website application servers, the access portal computing device being separate from the SIP devices and each SIP device communicating with the access portal computing device only via a SIP session, SIP user credentials based upon receipt of a SIP message from a SIP device indicating a request to register with the access portal computing device;
    determining, by the access portal computing device, website user credentials associated with a website application server based on the SIP user credentials;
    receiving, from the website application server, a communication services application based upon transmission of the website user credentials to the website application server via a web-based connection;
    translating by the access portal computing device, SIP requests received from the SIP device into web-based commands for transmission to the website application server via the communication services application; and
    translating by the access portal computing device, web-based commands received from the website application server via the communication services application into SIP requests for transmission to the SIP device;
    wherein a communication session is established between the SIP device and the website application server via the access portal computing device.

16. The method of claim 15, wherein authenticating the SIP user credentials comprises:
    requesting, by the access portal computing device, the SIP user credentials from the SIP device upon receipt of the SIP message;
    receiving, by the access portal computing device, the SIP user credentials from the SIP device based on the request for the SIP user credentials;
    validating, by the access portal computing device, the received SIP user credentials against SIP user data stored in a database coupled to the access portal computing device; and
    transmitting, by the access portal computing device to the SIP device, a SIP message indicating a successful registration of the SIP device.

17. The method of claim 15, wherein transmission of the website user credentials to the website application server occurs via an HTML form request.

18. The method of claim 15, wherein the communication services application is a WebRTC application.

19. The method of claim 18, wherein the communication services application includes a JavaScript module.

20. The method of claim 18, wherein the communication services application includes one or more HTML pages.

21. The method of claim 15, wherein the access portal computing device translates the SIP requests into web-based commands using a SIP user profile stored in a database coupled to the access portal computing device.

22. The method of claim 15, wherein the access portal computing device translates the web-based commands into SIP requests using an HTML user profile stored in a database coupled to the access portal computing device.

23. The method of claim 15, further comprising establishing a communication session between the SIP device and a web client device connected to the website application server.

24. The method of claim 23, wherein media flows directly between the SIP device and the web client device once the communication session between the SIP device and the web client device is established.

25. The method of claim 23, wherein media flows between the SIP device and the web client device via the access portal computing device once the communication session between the SIP device and the web client device is established.

26. The method of claim 15, wherein the SIP requests and web-based commands are associated with call signaling and/or call transaction events.

27. The method of claim 15, wherein the access portal computing device and the website application server communicate using WebSockets.

28. The method of claim 15, further comprising a network address translation (NAT) device coupled between the SIP device and the access portal computing device.

29. The method of claim 15, wherein the communication session between the SIP device and the website application server is encrypted.

30. A computer program product, tangibly embodied in a non-transitory computer readable storage medium, for establishing and controlling communication sessions between Session Initiation Protocol (SIP) devices and website application servers, the computer program product including instructions operable to cause an access portal computing device coupled between one or more SIP devices and one or more website application servers, the access portal computing device being separate from the SIP devices and each SIP device communicating with the access portal computing device only via a SIP session, to:
    authenticate SIP user credentials based upon receipt of a SIP message from a SIP device indicating a request to register with the access portal computing device;

determine website user credentials associated with a website application server based on the SIP user credentials;
receive, from the website application server, a communication services application based upon transmission of the website user credentials to the website application server via a web-based connection;
translate, at the access portal computing device, SIP requests received from the SIP device into web-based commands for transmission to the website application server via the communication services application; and
translate, at the access portal computing device, web-based commands received from the website application server via the communication services application into SIP requests for transmission to the SIP device;
wherein a communication session is established between the SIP device and the website application server via the access portal computing device.

* * * * *

UNITED STATES PATENT AND TRADEMARK OFFICE
CERTIFICATE OF CORRECTION

PATENT NO. : 8,695,077 B1  
APPLICATION NO. : 13/827857  
DATED : April 8, 2014  
INVENTOR(S) : Gerhard et al.

Page 1 of 1

It is certified that error appears in the above-identified patent and that said Letters Patent is hereby corrected as shown below:

In the Claims

Col. 15, lines 55 and 59: add "," after the word "translating"

Signed and Sealed this
Twenty-ninth Day of July, 2014

Michelle K. Lee
*Deputy Director of the United States Patent and Trademark Office*